US012425630B2

(12) United States Patent
Li

(10) Patent No.: US 12,425,630 B2
(45) Date of Patent: Sep. 23, 2025

(54) VIDEO ENCODING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 111 days.

(21) Appl. No.: 18/450,536

(22) Filed: Aug. 16, 2023

(65) Prior Publication Data
US 2023/0396790 A1 Dec. 7, 2023

Related U.S. Application Data

(63) Continuation of application No. PCT/CN2022/127649, filed on Oct. 26, 2022.

(30) Foreign Application Priority Data

Dec. 15, 2021 (CN) .......................... 202111533211.8

(51) Int. Cl.
H04N 19/50 (2014.01)
H04N 19/105 (2014.01)
(Continued)

(52) U.S. Cl.
CPC .......... *H04N 19/50* (2014.11); *H04N 19/105* (2014.11); *H04N 19/114* (2014.11);
(Continued)

(58) Field of Classification Search
None
See application file for complete search history.

(56) References Cited

U.S. PATENT DOCUMENTS

2008/0115185 A1* 5/2008 Qiu .................... H04N 21/6437 375/E7.254
2012/0033734 A1* 2/2012 Demos .................. H04N 19/51 375/E7.243
(Continued)

FOREIGN PATENT DOCUMENTS

CN 110784717 A 2/2020
CN 112040233 A 12/2020
(Continued)

OTHER PUBLICATIONS

The World Intellectual Property Organization (WIPO) International Search Report for PCT/CN2022/127649 Nov. 30, 2022 5 Pages (including translation).

*Primary Examiner* — Samuel D Fereja
(74) *Attorney, Agent, or Firm* — ANOVA LAW GROUP PLLC

(57) ABSTRACT

A method includes encoding a first picture frame in a video clip as a video key frame, and encoding a plurality of picture frames after the first picture frame according to an encoding order. For a current picture frame, if it is determined that a network status of a receiving end satisfies transmitting and receiving conditions, the current picture frame is encoded based on a corresponding frame type of the current picture frame in a first encoding structure, and if it is determined that the network status does not satisfy the transmitting and receiving conditions, the current picture frame is encoded based on a corresponding frame type of the current picture frame in a second encoding structure. A quantity of bidirectional predicted frames in the second encoding structure is smaller than that in the first encoding structure.

18 Claims, 13 Drawing Sheets

(51) Int. Cl.
*H04N 19/114* (2014.01)
*H04N 19/136* (2014.01)
*H04N 19/164* (2014.01)
*H04N 19/172* (2014.01)
*H04N 19/177* (2014.01)

(52) U.S. Cl.
CPC ......... *H04N 19/136* (2014.11); *H04N 19/164* (2014.11); *H04N 19/172* (2014.11); *H04N 19/177* (2014.11)

(56) References Cited

U.S. PATENT DOCUMENTS

| | | |
|---|---|---|
| 2020/0413051 A1 | 12/2020 | Grois et al. |
| 2021/0368179 A1 | 11/2021 | Shi et al. |
| 2024/0348786 A1* | 10/2024 | Chen .................... H04N 19/159 |

FOREIGN PATENT DOCUMENTS

| | | |
|---|---|---|
| CN | 112291559 A | 1/2021 |
| CN | 112929747 A | 6/2021 |
| WO | 2021009155 A1 | 1/2021 |

* cited by examiner

GOP after the video clip is encoded based on the first encoding structure (BBP)

GOP after the video clip is encoded based on the second encoding structure (BP)

GOP after the video clip is encoded based on the second encoding structure (P)

VIDEO ENCODING METHOD AND APPARATUS, ELECTRONIC DEVICE, AND STORAGE MEDIUM

CROSS-REFERENCE TO RELATED APPLICATIONS

This application is a continuation of International Application No. PCT/CN2022/127649, filed on Oct. 26, 2022, which claims priority to Chinese Patent Application No. 202111533211.8, entitled "VIDEO ENCODING METHOD AND APPARATUS, ELECTRONIC DEVICE, AND STORAGE MEDIUM" filed with the China National Intellectual Property Administration on Dec. 15, 2021, which are incorporated by reference in their entirety.

FIELD OF THE TECHNOLOGY

This application relates to the field of computer technologies, and in particular, to a video encoding method and apparatus, an electronic device, and a storage medium.

BACKGROUND OF THE DISCLOSURE

At present, when a device transmits video data to another device, the device usually encodes the video data to compress the video data, and then transmits the encoded video data, thereby reducing pressure on network bandwidth.

Typically, an encoding process of video data is as follows: encoding a plurality of pictures in a video to generate groups of pictures (GOPs), where a GOP is a group of continuous pictures and may include one I frame, a plurality of B frames, and a plurality of P frames, for example, IBBPBBP. I frame is an intra coded frame, i.e., an independent frame carrying all information of the frame of picture, and may be independently decoded without referring to other pictures. P frame is a forward predicted frame, representing the difference between the current frame of picture and the previous picture (I frame or P frame), and can be decoded by referring to the previous I frame or P frame. B frame is a bidirectional predicted frame, representing the difference between the current frame of picture and the previous picture (I frame or P frame) and the subsequent picture (P frame), and can be decoded by referring to the previous I frame or P frame and the subsequent P frame.

In the GOPs obtained through the foregoing encoding process, decoding orders and presentation orders of the plurality of encoded frames are different. For example, a portion of the encoded frames in a GOP are IBBP, and a presentation order of the encoded frames is: IBBP. When the two B frames are decoded, picture information of the previous I frame and the subsequent P frame needs to be known. Therefore, the two B frames can be decoded after the P frame is decoded, that is, a decoding order of the encoded frames is: IPBB.

SUMMARY

In accordance with the disclosure, there is provided a video encoding method including encoding a first picture frame in a video clip as a video key frame, and encoding a plurality of picture frames after the first picture frame according to an encoding order. Encoding the plurality of picture frames includes, for a current picture frame of the plurality of picture frames, performing one of following operations: in response to determining that a network status of a receiving end of the video clip satisfies transmitting and receiving conditions, encoding the current picture frame based on a corresponding frame type of the current picture frame in a first encoding structure, or in response to determining that the network status does not satisfy the transmitting and receiving conditions, encoding the current picture frame based on a corresponding frame type of the current picture frame in a second encoding structure. The first encoding structure at least includes M1 bidirectional predicted frames and one forward predicted frame in accordance with a first set order, where M1 is an integer and satisfies M1>0. The second encoding structure at least includes M2 bidirectional predicted frames and one forward predicted frame in accordance with a second set order, where M2 is an integer and satisfies M2≥0 and M2<M1.

Also in accordance with the disclosure, there is provided an electronic device including a memory storing program codes and a processor configured to execute the program codes to encode a first picture frame in a video clip as a video key frame, and encode a plurality of picture frames after the first picture frame according to an encoding order. Encoding the plurality of picture frames includes, for a current picture frame of the plurality of picture frames, performing one of following operations: in response to determining that a network status of a receiving end of the video clip satisfies transmitting and receiving conditions, encoding the current picture frame based on a corresponding frame type of the current picture frame in a first encoding structure, or in response to determining that the network status does not satisfy the transmitting and receiving conditions, encoding the current picture frame based on a corresponding frame type of the current picture frame in a second encoding structure. The first encoding structure at least includes M1 bidirectional predicted frames and one forward predicted frame in accordance with a first set order, where M1 is an integer and satisfies M1>0. The second encoding structure at least includes M2 bidirectional predicted frames and one forward predicted frame in accordance with a second set order, where M2 is an integer and satisfies M2≥0 and M2<M1.

Also in accordance with the disclosure, there is provided a non-transitory computer-readable storage medium storing program codes that, when executed by a processor, cause the processor to encode a first picture frame in a video clip as a video key frame, and encode a plurality of picture frames after the first picture frame according to an encoding order. Encoding the plurality of picture frames includes, for a current picture frame of the plurality of picture frames, performing one of following operations: in response to determining that a network status of a receiving end of the video clip satisfies transmitting and receiving conditions, encoding the current picture frame based on a corresponding frame type of the current picture frame in a first encoding structure, or in response to determining that the network status does not satisfy the transmitting and receiving conditions, encoding the current picture frame based on a corresponding frame type of the current picture frame in a second encoding structure. The first encoding structure at least includes M1 bidirectional predicted frames and one forward predicted frame in accordance with a first set order, where M1 is an integer and satisfies M1>0. The second encoding structure at least includes M2 bidirectional predicted frames and one forward predicted frame in accordance with a second set order, where M2 is an integer and satisfies M2≥0 and M2<M1.

DESCRIPTION OF EMBODIMENTS

Figure 1:
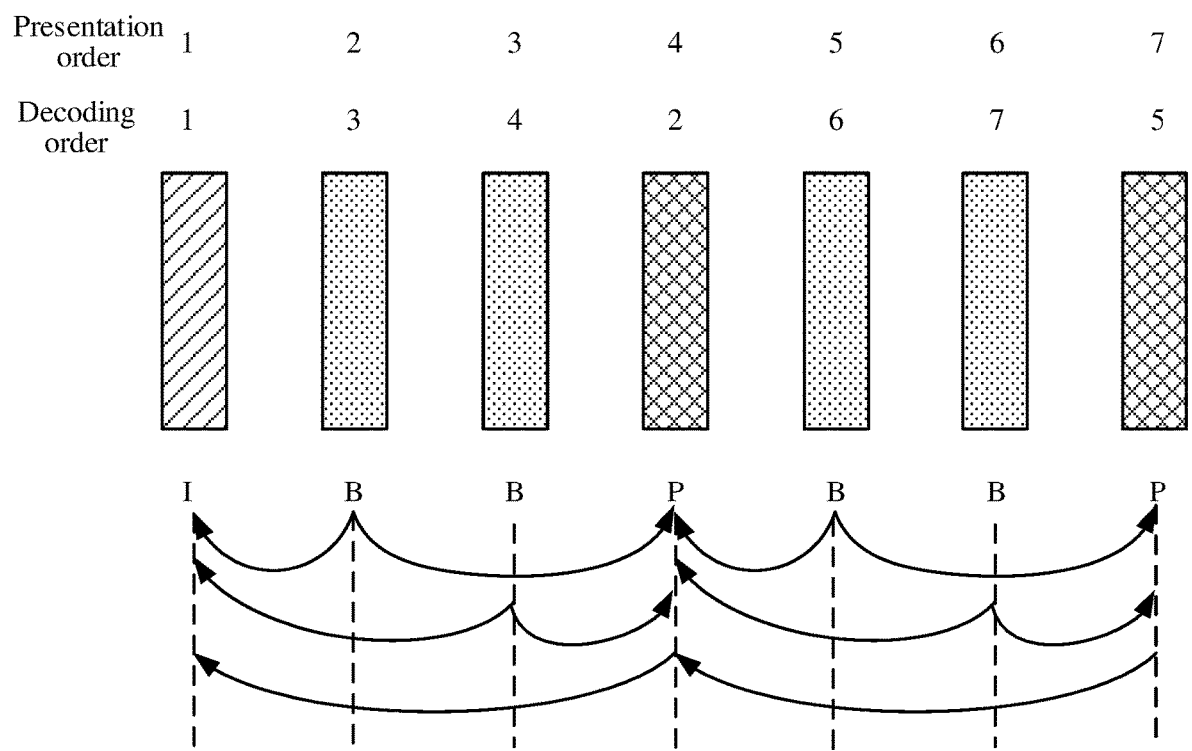
FIG. 1 is a schematic diagram of a GOP according to an embodiment of this application.

To make objectives, technical solutions, and advantages of this application clearer, this application is further described below in detail with reference to accompanying drawings. Apparently, the described embodiments are only a part rather than all of the embodiments of this application. All other embodiments obtained by a person of ordinary skill in the art based on the embodiments of this application without creative efforts shall fall within the protection scope of this application.

To make a person skilled in the art understand the technical solutions in this application better, the following describes some concepts involved in this application.

IDR frame: In video encoding algorithms (such as H.264, H.265, H.266, and AV1), pictures in a video are organized in sequences. A first picture of a sequence is called an IDR (instantaneous decoder refresh) picture, and IDR frame pictures are all I frame pictures. There may be many I frame pictures in a sequence, and the pictures after the I frame pictures may refer to pictures between the I frame pictures as motion references.

I frame: The I frame is also referred to as an intra coded frame or a key frame, which is an independent frame carrying all information of the frame of picture, and may be independently decoded without referring to other pictures, and may be simply understood as a static picture. The first frame in a video sequence is always an I frame because it is a key frame. The IDR frame may cause a decoded picture buffer (DPB) to be emptied, while the I frame may not. An IDR frame picture is necessarily an I frame picture, but an I frame picture is not necessarily an IDR frame picture.

DPB: A decoder needs to buffer a plurality of latest picture reference frames when decoding a video, and this buffer is called DPB. Decoded pictures are buffered in the DPB for use as reference pictures by subsequent encoded frames. Therefore, the decoder needs to manage the pictures in the DPB according to rules.

P frame: Forward predicted frame. The P frame represents a difference between the frame and a previous reference frame (I frame or P frame), and is decoded by using a previously buffered picture plus a difference defined by the frame, so as to generate a final picture.

B frame: Bidirectional predicted frame. The B frame is a bidirectional differential frame, that is, the B frame records the difference between the current frame and previous and subsequent frames. The B frame may or may not be used as a reference frame for other B frames.

Macroblock: A basic unit of encoding. An picture for encoding is first divided into a plurality of blocks before processing, and a macroblock is composed of an integer number of blocks.

Slice: A frame of video picture may be encoded into one or more slices, and each slice contains an integer number of macroblocks, that is, each slice contains at least one macroblock, or at most macroblocks of the whole picture. The purpose of the slice is to limit spread and transmission of error codes, so that encoded slices remain independent of each other.

GOP (group of pictures): A group of picture frames between two I frames, such as IBBPBBPBBP.

Minigop (mini group of pictures): Within a GOP, there will be a quantity of B frames between two P frames, and the group of picture frames between the two P frames is a minigop. For example, in IBBPBBPBBP, minigops include BBP, BBP, and BBP.

DTS: Decoding time stamp. The time stamp is used for indicating when a player decodes a frame of data.

PTS: Presentation time stamp. The time stamp is used for indicating when a player presents a frame of data.

Video rendering pause: A player renders a video at regular intervals according to FPS and PTS of the video. When a video buffer is to be rendered at a fixed interval, if rendered video content cannot be extracted from the buffer of the video, it is considered as a video rendering pause.

The term "exemplary" used below means "as an example, an embodiment, or illustrative." Any embodiment explained as "exemplary" needs not be interpreted as superior to or better than other embodiments.

The terms "first" and "second" in the specification are used only for the purpose of description, and cannot be understood as indicating or implying the relative importance or implicitly specifying a quantity of the indicated technical features. Therefore, a feature defined to be "first" or "second" may explicitly or implicitly include one or more features. In the descriptions of the embodiments of this application, "a plurality of" refers to two or more, unless otherwise stated.

The design idea of the embodiments of this application is simply described below.

In related technologies, an encoding process of video data is as follows: encoding a plurality of pictures in a video to generate GOPs, where a GOP is a group of continuous pictures and may include one I frame, a plurality of B frames, and a plurality of P frames, for example, IBBPBBP.

In the foregoing GOPs, decoding orders and presentation orders of a plurality of encoded frames are different. For example, as shown in FIG. 1, if a GOP is the foregoing IBBPBBP, a presentation order of encoded frames contained in the GOP is IBBPBBP, that is, presentation sequence numbers of the encoded frames from left to right are 1, 2, 3, 4, 5, 6, and 7. For a portion of the encoded frames IBBP, when two B frames are decoded, picture information in the previous I frame and the subsequent P frame needs to be known. Therefore, the two B frames can be decoded after the P frame is decoded, that is, a decoding order of the encoded frames is: IPBB. Similarly, for another portion of the encoded frames BBP, their decoding order is: PBB. Therefore, an overall decoding order of the foregoing GOP is IPBBPBB, namely, decoding sequence numbers of the encoded frames from left to right are 1, 3, 4, 2, 6, 7, and 5.

It may be seen that the decoding time stamp DTS (namely, 1, 3, 4, 2, 6, 7, and 5) and the presentation time stamp PTS (namely 1, 2, 3, 4, 5, 6, and 7) of the foregoing GOP are different. Because the decoding order and presentation order of the GOP are different, video decoding delay and video rendering pause are easily caused, video playback is not smooth, and video playback quality is reduced.

In view of this, embodiments of this application provide a video encoding method and apparatus, an electronic device, and a storage medium, which may adjust an encoding structure in real time according to a network status of a receiving end when a video clip is being encoded. Specifically, when the network status of the receiving end satisfies transmitting and receiving conditions, encoding is performed according to a first encoding structure; or when the network status of the receiving end does not satisfy the transmitting and receiving conditions, encoding is performed according to a second encoding structure, that is, bidirectional predicted frames are closed or a quantity of bidirectional predicted frames is reduced, which may reduce delay during video decoding and relieve video rendering pause, thereby improving video playback quality.

The embodiments of this application will be described in detail below with reference to the accompanying drawings. It is to be understood that the embodiments described here are merely used for explaining and interpreting this application, rather than limiting this application, and the embodiments of this application and the features of the embodiments may be combined with each other on a non-conflict basis.

Figure 2:
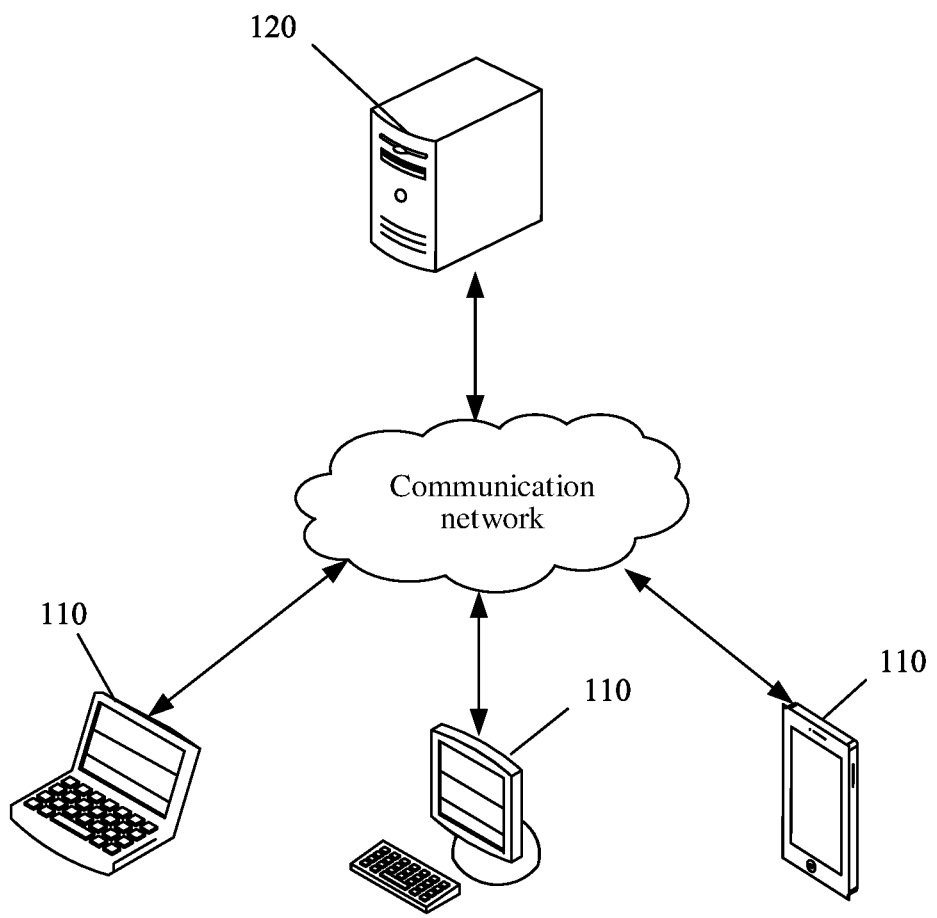
FIG. 2 is a schematic diagram of an application scenario of a video encoding method according to an embodiment of this application.

FIG. 2 is a schematic diagram of an application scenario according to an embodiment of this application. The application scenario includes a plurality of terminal devices 110 and a server 120. The terminal devices 110 may communicate with the server 120 through a communication network.

In some implementations, the communication network may be a wired network or a wireless network.

In the embodiments of this application, the terminal devices 110 include but are not limited to devices such as a mobile phone, a tablet computer, a notebook computer, a desktop computer, an e-book reader, an intelligent voice interaction device, a smart home appliance, and a vehicle-mounted terminal. The terminal device 110 may be installed with a video related client. The client may be software (such as live streaming software, game software, or video call software), a web page, a mini program, or the like. The server 120 is a back-end server corresponding to the software, web page, mini program, or the like, or a server specifically used for video encoding. These are not limited in this application. The server 120 may be an independent physical server, or may be a server cluster or distributed system including a plurality of physical servers, or may be a cloud server providing basic cloud computing services such as cloud services, a cloud database, cloud computation, cloud functions, cloud storage, network services, cloud communication, middleware services, domain name services, security services, a CDN (Content Delivery Network), big data, and an artificial intelligence platform.

The video encoding method in the embodiments of this application may be performed by an electronic device, and the electronic device may be the server 120 or the terminal device 110, that is, the method may be performed separately by the server 120 or the terminal device 110.

For example, in a live streaming scenario, a terminal device of an audience may present video data collected by a terminal device of a host. In this process, the terminal device of the host sends the collected video data to the server. After receiving the video data, the server encodes the video data by using the video encoding method in the embodiments of this application, and then transmits the encoded video data to the terminal device of the audience.

As another example, in a cloud rendering scenario, a user may use a terminal device to log in to a target application, such as a game application. When the user triggers a corresponding presentation operation, the terminal device sends a presentation request to the server through the game application. The server renders corresponding video data according to the presentation request, encodes the video data by using the video encoding method in the embodiments of this application, and then transmits the encoded video data to a terminal device of the user.

As still another example, in a video call scenario, a terminal device of a near end user may collect video data of a near end, then encode the video data by using the video encoding method in the embodiments of this application, and transmit the encoded video data to a terminal device of a far end user.

FIG. 2 is only an example. In fact, quantities of terminal devices and servers are not limited, and there is no specific limitation in the embodiments of this application.

A video encoding method provided in exemplary implementations of this application will be described below in conjunction with the application scenario described above and with reference to the accompanying drawings. The foregoing application scenario is merely shown for facilitating the understanding of the spirit and principles of this application, and the implementations of this application are not subject to any limitations in this regard. Moreover, the embodiments of this application may be applied to various scenarios, including real-time communications (RTC) scenarios such as video live streaming, cloud rendering, and video calls, and further including but not limited to scenarios such as cloud technology, artificial intelligence, intelligent transportation, and assisted driving.

Figure 3:
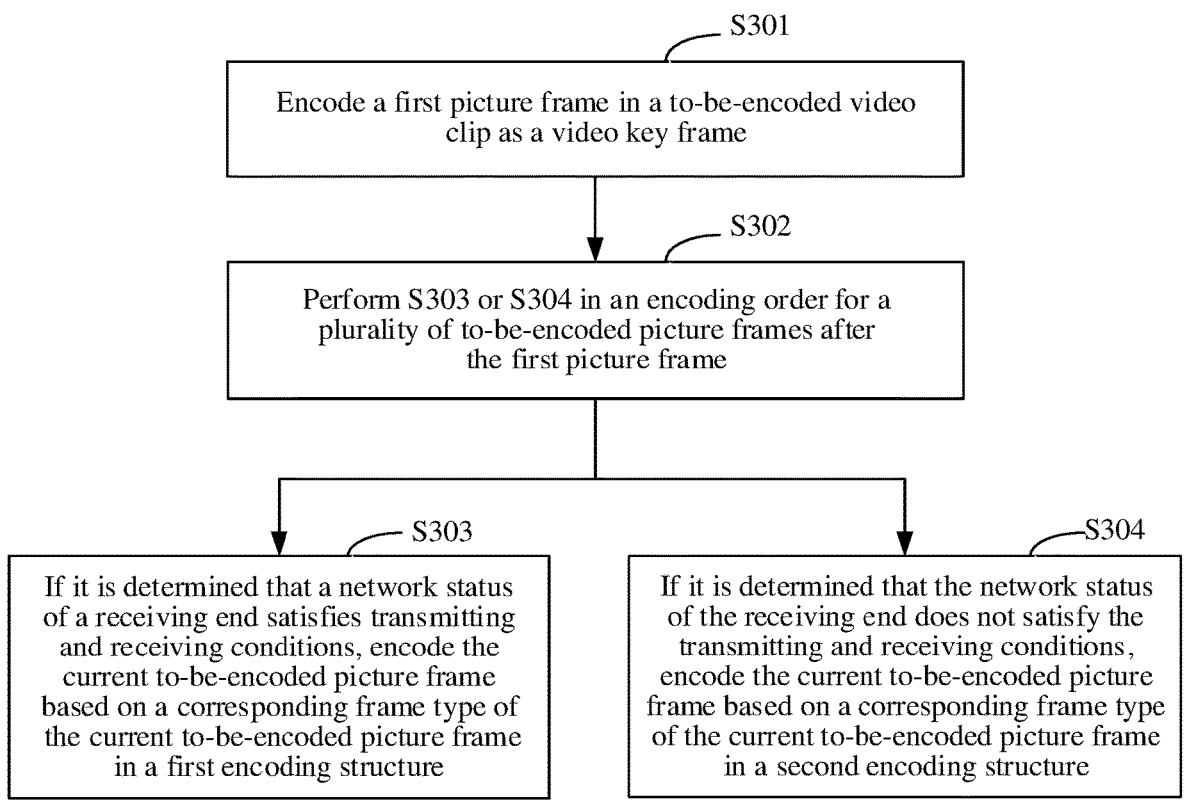
FIG. 3 is a flowchart of a video encoding method according to an embodiment of this application.

As shown in FIG. 3, an embodiment of this application provides a video encoding method. The method may be performed by a server or a terminal device, and includes the following steps:

S301: Encode a first picture frame in a video clip to be encoded as a video key frame.

The video clip to be encoded may be a video clip in video data to be encoded. The first picture frame may be understood as a picture frame ranked first in the video clip. The video clip may be encoded as a GOP. A first encoded frame of the GOP is the video key frame, namely, an I frame, also known as an intra coded frame, is an independent frame carrying all the information of the frame of picture, and may be independently decoded without referring to other pictures.

Therefore, in an encoding process, the first picture frame in the video clip is first encoded as an I frame. The I frame may be used as an IDR frame, that is, the video clip is a first video clip in the video data, or the I frame may not be used as an IDR frame, which is not limited here. In the following embodiments of this application, the key frame is referred to as an I frame.

Specifically, when the first picture frame is encoded as the video key frame, an existing encoding algorithm such as H.264, H.265, H.266, or AV1 may be used, and will not be repeated here.

For example, in the H.264 encoding algorithm, a picture frame may be encoded into one or more slices, and each slice contains an integer number of macroblocks, that is, each slice contains at least one macroblock, or at most macroblocks of the whole picture. Specifically, a picture frame may be divided into a plurality of blocks (for example, 4*4 pixels) for processing, the plurality of blocks may form a macroblock, and a size of the macroblock is usually 16*16 pixels. Macroblocks include I macroblocks, P macroblocks, and B macroblocks, where the I macroblocks may only use decoded pixels in the current slice as references for intra prediction; the P macroblocks may use previously decoded pictures as reference pictures for intra prediction; and the B macroblocks use forward and backward reference pictures for intra prediction. An I frame picture may include one or more I macroblocks.

In some embodiments, when the video data to be encoded is obtained, the video clip to be encoded may be determined in the following three possible ways:

In the first possible way, the obtained video data is divided into a plurality of video clips, and video clips to be encoded are sequentially selected from the plurality of video clips.

For example, the video data is a 20 second video, with 25 frames per second and a total of 500 frames of pictures. The video can be divided into a plurality of video clips each including a certain quantity of picture frames. Specifically, the video can be divided every fixed quantity of picture frames, or every non-fixed quantity of picture frames. In this way, the quantity of picture frames in each video clip may be the same as or different from that in other video clips, which is not limited here.

For example, every 120 picture frames are to be in one video clip, then 5 video clips may be obtained, where the first 4 video clips each contain 120 picture frames, and the $5^{th}$ video clip contains 20 picture frames. As another example, 120 picture frames are first put into a video clip, then next 100 picture frames are put into a video clip, and then next 120 picture frames are put into a video clip, and so on, and a plurality of video clips are obtained.

In the second possible way, video clips to be encoded are sequentially selected in a fixed step size from the obtained video data, where the fixed step size includes a set quantity of picture frames.

In this way, the fixed step size may be set according to a need, and is not limited here. Still use video data containing 500 frames of pictures as an example. Assuming that the fixed step size is 120 picture frames, 120 picture frames are sequentially selected for encoding from the 500 frames of pictures, then 120 picture frames are sequentially selected for encoding, and so on.

In the third possible way, video clips to be encoded are sequentially selected in a non-fixed step size from the obtained video data.

Still use video data containing 500 frames of pictures as an example, 120 picture frames are sequentially selected for encoding from the 500 frames of pictures, then 100 picture frames are sequentially selected for encoding, 90 picture frames are sequentially selected for encoding, and so on.

S302: Perform S303 or S304 in an encoding order for a plurality of picture frames to be encoded after the first picture frame.

S303: If it is determined that a network status of a receiving end satisfies transmitting and receiving conditions, encode the current picture frame to be encoded based on a corresponding frame type of the current picture frame to be encoded in a first encoding structure, the first encoding structure at least including: M1 bidirectional predicted frames and one forward predicted frame in accordance with a first set order, where M1 is an integer and M1>0.

S304: If it is determined that the network status of the receiving end does not satisfy the transmitting and receiving conditions, encode the current picture frame to be encoded based on a corresponding frame type of the current picture frame to be encoded in a second encoding structure, the second encoding structure at least including: M2 bidirectional predicted frames and one forward predicted frame in accordance with a second set order, where M2 is an integer, M2≥0, and M2<M1.

The receiving end may be a terminal device. For example: in a live streaming scenario, a server may encode video data of a host end, and then send the encoded video data to a terminal device of an audience, namely, the receiving end; in a cloud rendering scenario, a server may encode rendered video data, and then send the encoded video data to a terminal device of a user, namely, the receiving end; or in a video call scenario, a terminal device of a user may encode video data, and then send the encoded video data to a terminal device of another user, namely, the receiving end.

In one embodiment, the network status of the receiving end may be determined according to a data receiving status reported by the receiving end, for example, the data receiving status may include at least one of the following: a number of video pauses within first unit duration, duration of video pauses within second unit duration, duration of a rendering pause, and a packet loss rate of video data packets.

The first unit duration and the second unit duration may be set as needed, and may be the same, for example, 100 seconds, or different, for example, the first unit duration is 100 seconds, and the second unit duration is 90 seconds, which are not limited here.

For example, the number of video pauses within the first unit duration may be determined as follows: (the number of pauses/watching duration at a time)*100.

The duration of video pauses within the second unit duration may be determined as follows: (duration of pauses/watching duration at a time)*100.

The duration of a rendering pause may be determined as follows: (duration of rendering pauses/watching duration at a time)*100.

Further, the foregoing transmitting and receiving conditions may include at least one of the following:
the number of video pauses within the first unit duration is not greater than a number threshold;
the duration of video pauses within the second unit duration is not greater than a first duration threshold;
the duration of a rendering pause is not greater than a second duration threshold; and
the packet loss rate of video data packets is not greater than a set threshold.

The number threshold, the first duration threshold, the second duration threshold, and the set threshold may be set as needed, and the first duration threshold and the second duration threshold may be the same or different. For example, the number threshold is 2, the first duration threshold is 3 seconds, the second duration threshold is 3 seconds, and the set threshold is 5%. There is no limit here.

In S303 above, the bidirectional predicted frames in the first encoding structure may be abbreviated as B frames, and the forward predicted frame may be abbreviated as a P frame. If M1 is 2, the first encoding structure may be BBP. In the embodiments of this application, the encoding structure may also be referred to as a minigop structure.

In step S304 above, the second encoding structure may not include B frames (namely, M2 is 0) or include B frames (namely, M2 is greater than 0). When B frames are included, a quantity of the B frames is smaller than that in the first encoding structure, for example, the first encoding structure is BBP, and the second encoding structure is BP. When B frames are not included, the second encoding structure is P, that is, all picture frames after the I frame are P frames.

In a specific implementation, it may be determined according to a specific situation whether the second encoding structure includes B frames, for example, because B frames are beneficial to reducing video transmission bandwidth and easily lead to video delay and pause, B frames may be included when both the video delay and pause and the video transmission bandwidth are focused; or when only the video delay and pause are focused, B frames may not be included.

The quantities of B frames in the first encoding structure and the second encoding structure may be set as needed, and are not limited in the embodiments of this application.

Figure 4:
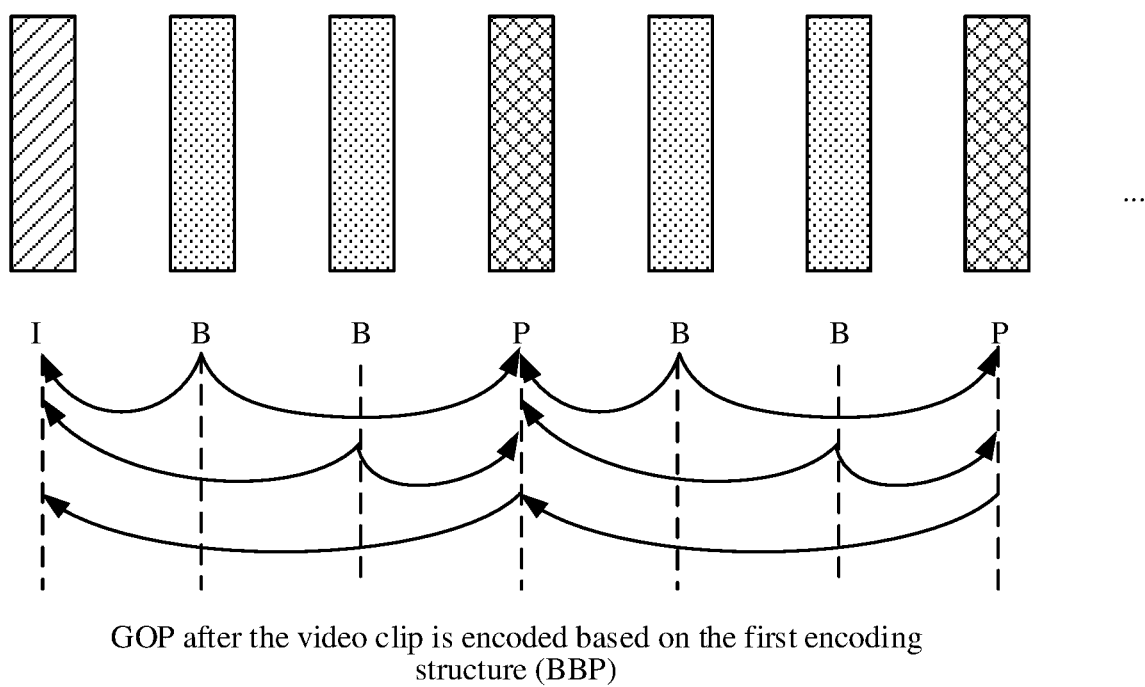
FIG. 4 is a schematic diagram of a GOP after a video clip is encoded according to an embodiment of this application.

If the first encoding structure is BBP, and the network status of the receiving end satisfies the receiving condition, a GOP corresponding to the video clip may be obtained by encoding the plurality of picture frames to be encoded after the first picture frame according to the first encoding structure: IBBPBBP . . . , as shown in FIG. 4.

Figure 5:
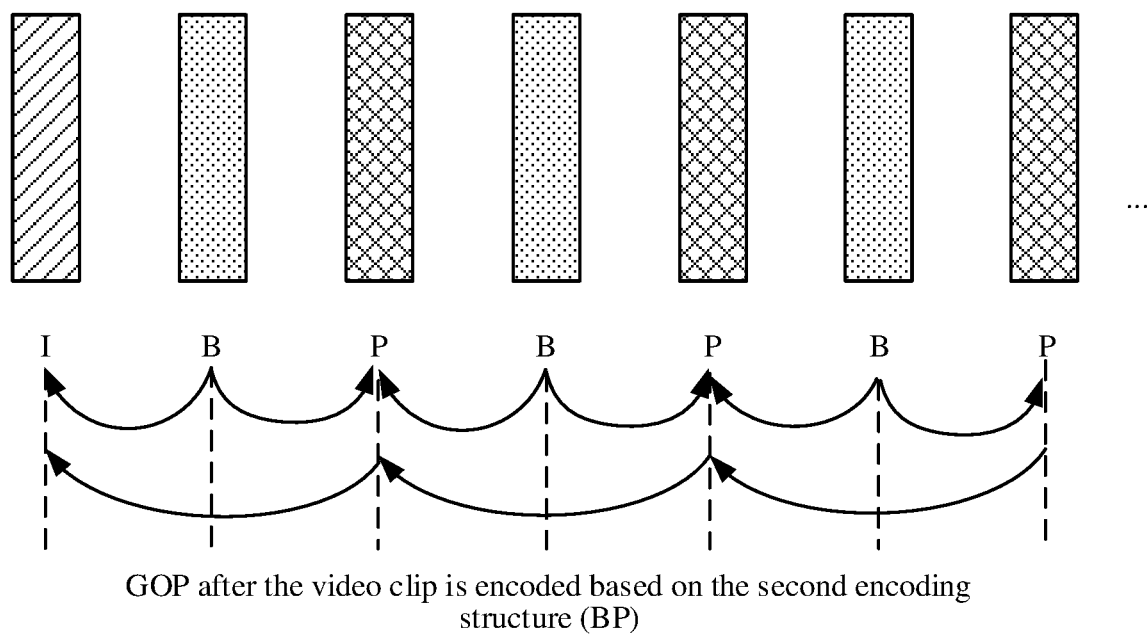
FIG. 5 is another schematic diagram of a GOP after a video clip is encoded according to an embodiment of this application.

If the second encoding structure is BP, and the network status of the receiving end does not satisfy the receiving condition, a GOP corresponding to the video clip may be obtained by encoding the plurality of picture frames to be encoded after the first picture frame according to the second encoding structure: IBPBP . . . , as shown in FIG. 5.

Figure 6:
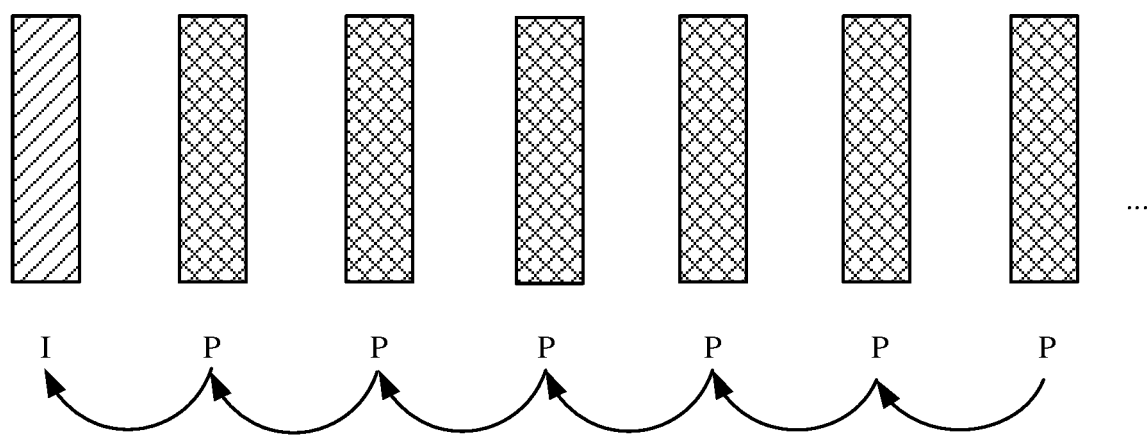
FIG. 6 is another schematic diagram of a GOP after a video clip is encoded according to an embodiment of this application.

If the second encoding structure is P, and the network status of the receiving end does not satisfy the receiving condition, a GOP corresponding to the video clip may be obtained by encoding the plurality of picture frames to be encoded after the first picture frame according to the second encoding structure: IPPPP . . . , as shown in FIG. 6.

The foregoing three types of GOP are obtained by encoding the video clip in a case that the network status of the receiving end remains unchanged in the encoding process. However, in practical applications, in the process of encoding a video clip, the network status of the receiving end may change. That is, a video clip may be encoded by combining the first encoding structure and the second encoding structure, namely, the encoding structure is adjusted in real time according to the network status of the receiving end, and may be switched between the first encoding structure and the second encoding structure.

Therefore, for a video clip, when each picture frame to be encoded after the first picture frame is encoded, the network status of the receiving end may be first determined, which may include the following two cases:

In the first case, corresponding to S303 above, when the current picture frame to be encoded is being encoded, if the network status satisfies the transmitting and receiving conditions, the picture frame to be encoded is encoded based on the first encoding structure.

Specifically, the corresponding frame type of the picture frame to be encoded in the first encoding structure is determined, such as a B frame or a P frame. If the frame type is a B frame, the picture frame to be encoded is encoded as a B frame. If the frame type is a P frame, the picture frame to be encoded is encoded as a P frame. When the picture frame to be encoded is encoded as a B frame or a P frame, an existing encoding algorithm, such as H.264, H.265, H.266, or AV1, may be used, which will not be repeated here.

In some embodiments, when the current picture frame to be encoded is being encoded, if the network status satisfies the transmitting and receiving conditions, and the previous encoded picture frame of the picture frame to be encoded is encoded based on the first encoding structure, that is, the network status does not change, the picture frame to be encoded may continue to be encoded based on the first encoding structure. Alternatively, when the current picture frame to be encoded is being encoded, if the network status satisfies the transmitting and receiving conditions, but the previous encoded picture frame of the picture frame to be encoded is encoded based on the second encoding structure, that is, the network status changes, and if the encoding of the minigop of the previous encoded picture frame is completed, the second encoding structure may be adjusted to the first encoding structure, namely, the current picture frame to be encoded may be encoded based on the first encoding structure.

In some embodiments, in S303, for encoding the picture frame to be encoded based on the corresponding frame type of the current picture frame to be encoded in the first encoding structure, before the picture frame to be encoded is encoded, the corresponding frame type of the picture frame to be encoded in the first encoding structure needs to be determined, which may be implemented through step A below:

A: Determine the corresponding frame type of the current picture frame to be encoded in the first encoding structure according to an interval between the current picture frame to be encoded and the previous forward predicted frame of the picture frame to be encoded, and the first encoding structure.

In some embodiments, the first encoding structure includes M1 B frames and one P frame, and the P frame is encoded prior to the B frame, that is, the P frame in a minigop is encoded first, and then the M1 B frames in the minigop are encoded, so if the distance between the current picture frame to be encoded and the previous encoded P frame (namely, the P frame in the current minigop) is 0 to M1-1, the current picture frame to be encoded is to be encoded as a B frame. Otherwise, if the distance is M1, it indicates that the current picture frame to be encoded is a P frame in the next minigop, which is separated by the M1 B frames from the previous encoded P frame.

For example, the first encoding structure is BBP, and M1=2. When the interval between the picture frame to be encoded and the previous encoded P frame is 2, the picture frame to be encoded is to be encoded as a P frame according to the first encoding structure. When the interval between the picture frame to be encoded and the previous encoded P frame is 0 or 1, the picture frame to be encoded is to be encoded as a B frame according to the first encoding structure.

Figure 7:
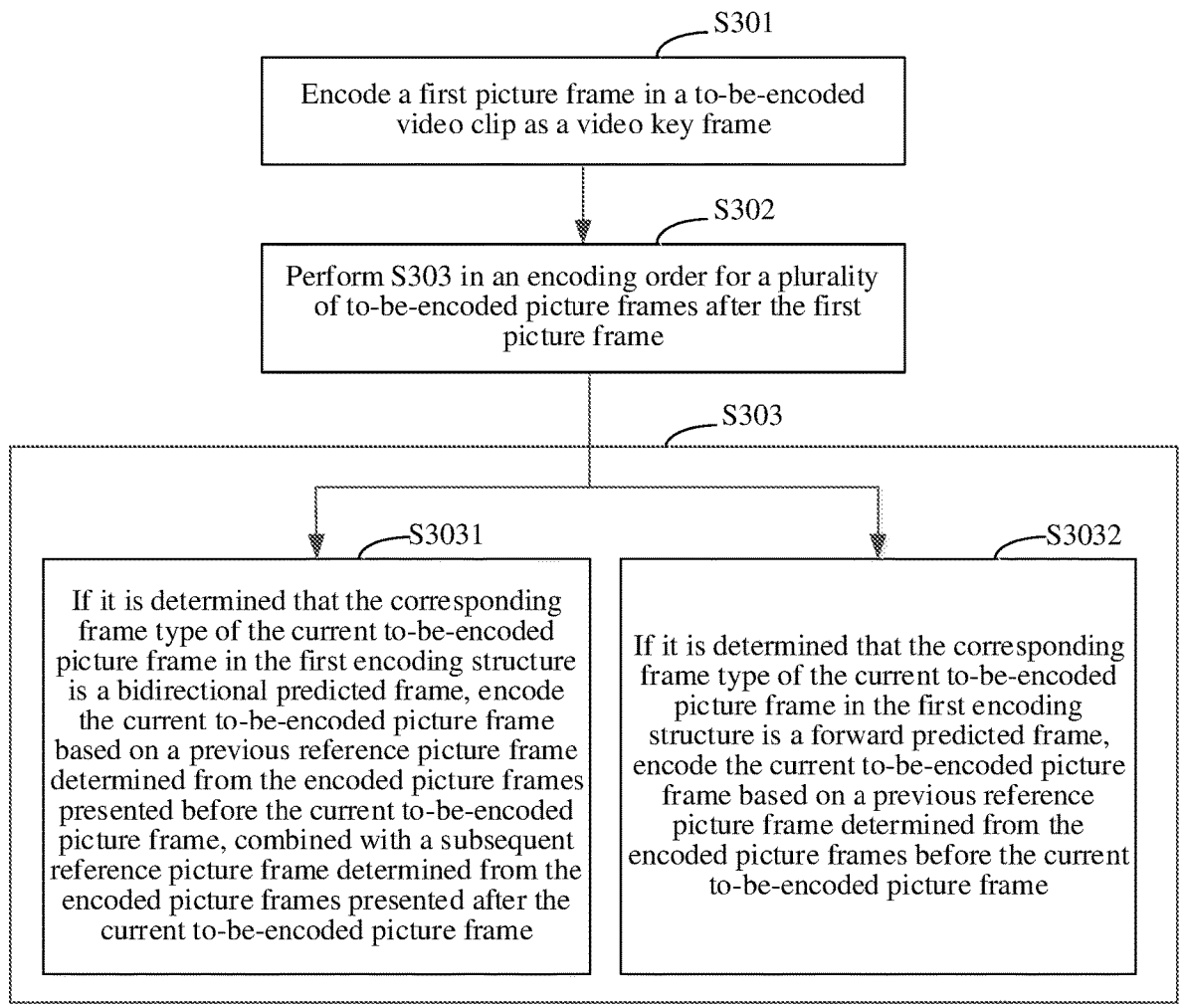
FIG. 7 is another flowchart of a video encoding method according to an embodiment of this application.

In some embodiments, as shown in FIG. 7, in S303, the encoding the picture frame to be encoded based on a corresponding frame type of the current picture frame to be encoded in a first encoding structure may include the following steps:

S3031: If it is determined that the corresponding frame type of the current picture frame to be encoded in the first encoding structure is a bidirectional predicted frame, encode the current picture frame to be encoded based on a previous reference picture frame determined from the encoded picture frames presented before the current picture frame to be encoded, combined with a subsequent reference picture frame determined from the encoded picture frames presented after the current picture frame to be encoded.

For example, the first encoding structure is BBP, the 3 picture frames presented before the current picture frame to be encoded are encoded as BBP respectively, the picture frame corresponding to the P frame may be used as the previous reference picture frame for the current picture frame to be encoded. The distance between the current picture frame to be encoded and the previous encoded forward predictive picture frame is 1. According to the first encoding structure, the current picture frame to be encoded is to be encoded as a B frame, and the 2 picture frames presented after the current picture frame to be encoded are to be encoded as BP, where the P frame is an encoded picture frame and may be used as the subsequent reference encoded frame for the current picture frame to be encoded.

Specifically, based on the differences of the current picture frame to be encoded from the previous reference picture frame and the subsequent reference picture frame, the current picture frame to be encoded may be encoded by using an existing encoding algorithm, such as H.264, H.265, H.266, or AV1, which will not be repeated here.

S3032: If it is determined that the corresponding frame type of the current picture frame to be encoded in the first encoding structure is a forward predicted frame, encode the current picture frame to be encoded based on a previous reference picture frame determined from the encoded picture frames before the current picture frame to be encoded.

For example, the first encoding structure is BBP, and the 3 picture frames encoded before the current picture frame to be encoded are sequentially encoded as PBB (the presentation order is BBP), where the picture frame corresponding to the P frame may be used as the previous reference picture frame for the current picture frame to be encoded.

Specifically, based on the difference between the current picture frame to be encoded and the previous reference picture frame, the current picture frame to be encoded may be encoded by using an existing encoding algorithm, such as H.264, H.265, H.266, or AV1, which will not be repeated here.

In the second case, corresponding to step S304 above, when the current picture frame to be encoded is being encoded, if the network status does not satisfy the transmitting and receiving conditions, the current picture frame to be encoded is encoded based on the second encoding structure.

Specifically, the corresponding frame type of the picture frame to be encoded in the second encoding structure is determined, such as a B frame or a P frame. If the frame type is a B frame, the picture frame is encoded as a B frame. If the frame type is a P frame, the picture frame is encoded as a P frame.

In some embodiments, when the current picture frame to be encoded is being encoded, if the network status does not satisfy the transmitting and receiving conditions, and the previous encoded picture frame of the current picture frame to be encoded is encoded based on the second encoding structure, that is, the network status does not change, the current picture frame to be encoded may continue to be encoded based on the second encoding structure. Alternatively, when the current picture frame to be encoded is being encoded, if the network status does not satisfy the transmitting and receiving conditions, but the previous encoded picture frame of the current picture frame to be encoded is encoded based on the first encoding structure, that is, the network status changes, and if the encoding of the minigop picture group of the previous encoded picture frame is completed, the first encoding structure may be adjusted to the second encoding structure, namely, the current picture frame to be encoded may be encoded based on the second encoding structure.

Similarly, in S304 above, before the current picture frame to be encoded is encoded based on the corresponding frame type of the current picture frame to be encoded in the first encoding structure, the corresponding frame type of the current picture frame to be encoded in the second encoding structure needs to be determined, which may be implemented through step B below:

B: Determine the corresponding frame type of the current picture frame to be encoded in the second encoding structure according to an interval between the current picture frame to be encoded and the previous forward predicted frame of the current picture frame to be encoded, and the second encoding structure.

In some embodiments, because the second encoding structure includes M2 B frames and 1 P frame, when the distance between the current picture frame to be encoded and the previous encoded P frame is 0 to M2-1, the current picture frame to be encoded is to be encoded as a B frame. Otherwise, if the distance is M2, the current picture frame to be encoded is to be encoded as a P frame.

For example, the second encoding structure is BP, and M2=1. When the interval between the current picture frame to be encoded and the previous encoded P frame is 1, the picture frame to be encoded is to be encoded as a P frame according to the second encoding structure. When the interval between the current picture frame to be encoded and the previous presented P frame is 0, the picture frame to be encoded is to be encoded as a B frame according to the second encoding structure.

Figure 8:
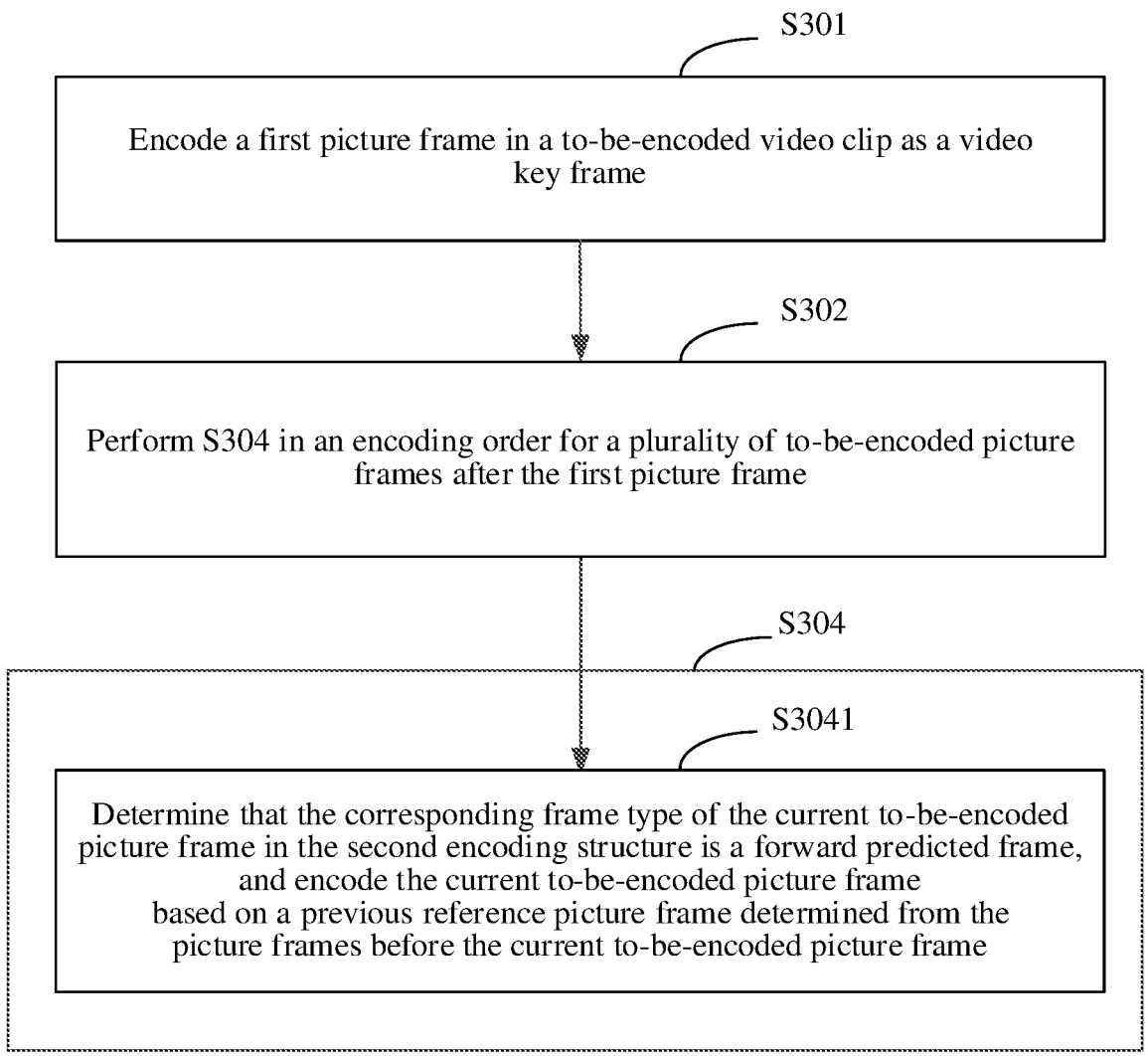
FIG. 8 is another flowchart of a video encoding method according to an embodiment of this application.

In some embodiments, as shown in FIG. 8, when M2=0, in S304, the encoding the current picture frame to be encoded based on a corresponding frame type of the current picture frame to be encoded in a second encoding structure includes the following steps:

S3041: Determine that the corresponding frame type of the current picture frame to be encoded in the second encoding structure is a forward predicted frame, and encode the current picture frame to be encoded based on a previous reference picture frame determined from the picture frames before the current picture frame to be encoded.

In this step, when M2=0, the second encoding structure does not include a B frame, but is a P frame. In this case, the previous picture frame (P frame) of the current picture frame to be encoded may be used as the previous reference picture frame for the current picture frame to be encoded, and the current picture frame to be encoded may be encoded based on the difference between the current picture frame to be encoded and the previous reference picture frame.

Figure 9:
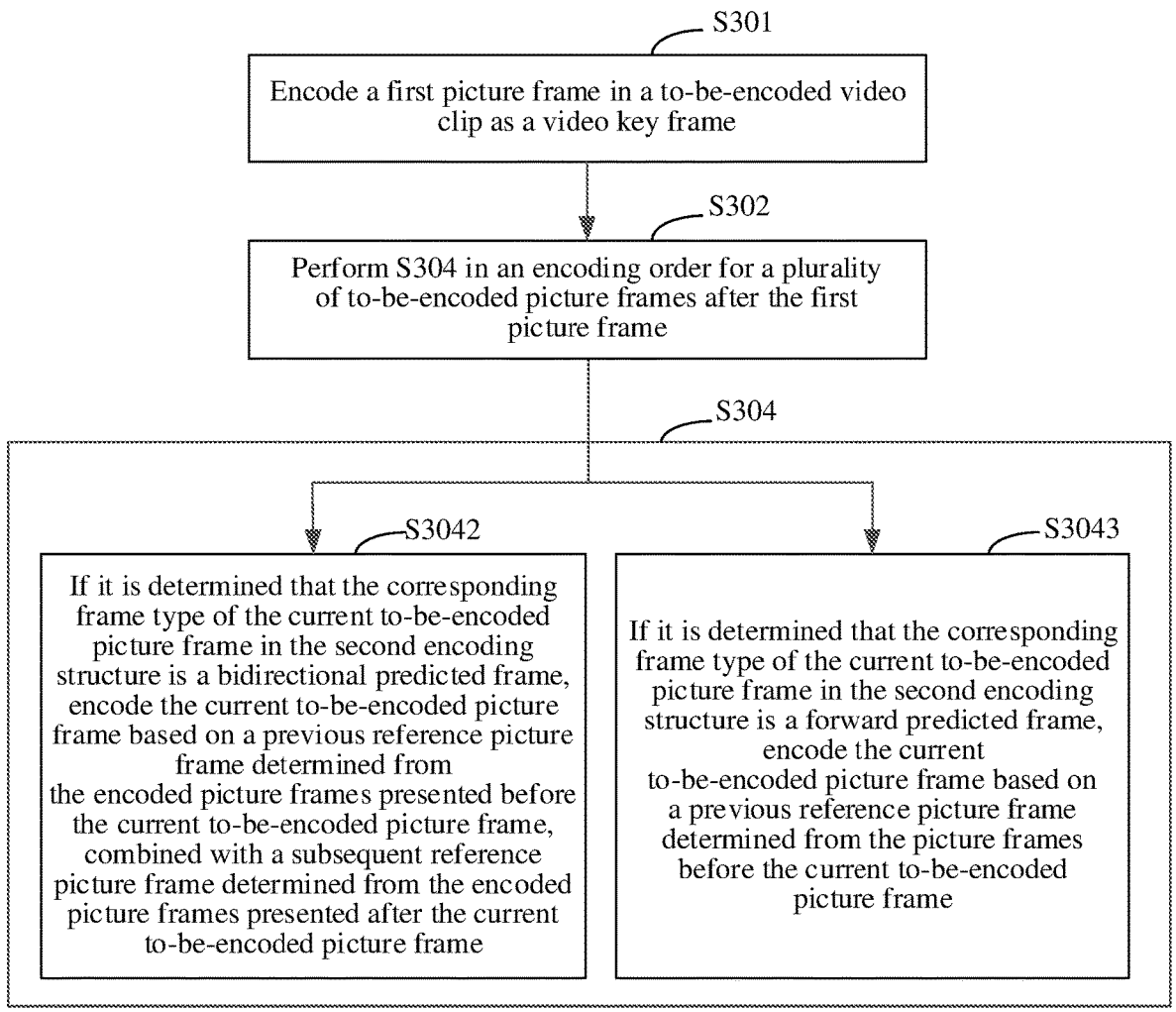
FIG. 9 is another flowchart of a video encoding method according to an embodiment of this application.

In other embodiments, as shown in FIG. 9, when M2>0, in step S304, the encoding the current picture frame to be encoded based on a corresponding frame type of the current picture frame to be encoded in a second encoding structure includes the following steps:

> S3042: If it is determined that the corresponding frame type of the current picture frame to be encoded in the second encoding structure is a bidirectional predicted frame, encode the current picture frame to be encoded based on a previous reference picture frame determined from the encoded picture frames presented before the current picture frame to be encoded, combined with a subsequent reference picture frame determined from the encoded picture frames presented after the current picture frame to be encoded.

For example, the second encoding structure is BP, namely, M2=1, the interval between the current picture frame to be encoded and the previous encoded P frame is 0, namely, the 3 picture frames encoded before the current picture frame to be encoded are sequentially encoded as PBP (presentation order BPXP, where X represents the current picture frame to be encoded), the picture frame corresponding to the first P frame may be used as the previous reference encoded frame for the current picture frame to be encoded, the current picture frame to be encoded is to be encoded as a B frame according to the second encoding structure, the picture frame presented after the current picture frame to be encoded is to be encoded as a P frame, and the P frame may be used as the subsequent reference encoded frame for the current picture frame to be encoded. Then, the current picture frame to be encoded is encoded based on the differences of the current picture frame to be encoded from the previous reference picture frame and the subsequent reference picture frame.

> S3043: If it is determined that the corresponding frame type of the current picture frame to be encoded in the second encoding structure is a forward predicted frame, encode the current picture frame to be encoded based on a previous reference picture frame determined from the picture frames before the current picture frame to be encoded.

For example, the second encoding structure is BP, M2=1, the distance between the current picture frame to be encoded and the previous encoded P frame is 1, the current picture frame to be encoded is to be encoded as a P frame according to the second encoding structure, and the picture frame corresponding to the previous P frame may be used as the previous reference encoded frame for the current picture frame to be encoded. Then, the current picture frame to be encoded is encoded based on the difference between the current picture frame to be encoded and the previous reference picture frame.

In the foregoing solution of the embodiments of this application, if the network status of the receiving end satisfies the transmitting and receiving conditions when each picture frame is encoded, each picture frame is encoded based on the first encoding structure; or in the encoding process based on the first encoding structure, if the network status of the receiving end does not satisfy the transmitting and receiving conditions, the current picture frame is encoded based on the second encoding structure. In this way, the purpose of adjusting the encoding structure in real time according to the network status of the receiving end is achieved. When the network status of the receiving end is poor, closing B frames or reducing a quantity of B frames may reduce delay during video decoding, relieve video rendering pauses, and thus improve video playback quality.

In a GOP, a group of picture frames between two P frames may be referred to as a minigop. For example, in IBBPBBPBBP, the minigop is BBP. Each minigop may be encoded by referring to its internal picture frames, and B frames need to be encoded by referring to previous P frames and subsequent P frames. Therefore, the encoding structure may be adjusted in units of minigop.

In the foregoing embodiment of this application, if the network status of the receiving end does not satisfy the transmitting and receiving conditions when the current picture frame to be encoded is being encoded, but the network status of the receiving end satisfies the transmitting and receiving conditions when the previous encoded picture frame of the picture frame is encoded, that is, the network status changes, whether the encoding of the minigop of the previous encoded picture frame of the current picture frame to be encoded is completed needs to be determined, and if so, the current picture frame to be encoded is encoded based on the second encoding structure; otherwise, the picture frame continues to be encoded based on the first encoding structure until all the picture frames in the minigop are encoded, and then the subsequent picture frame to be encoded of the last picture frame is encoded based on the second encoding structure.

Figure 10:
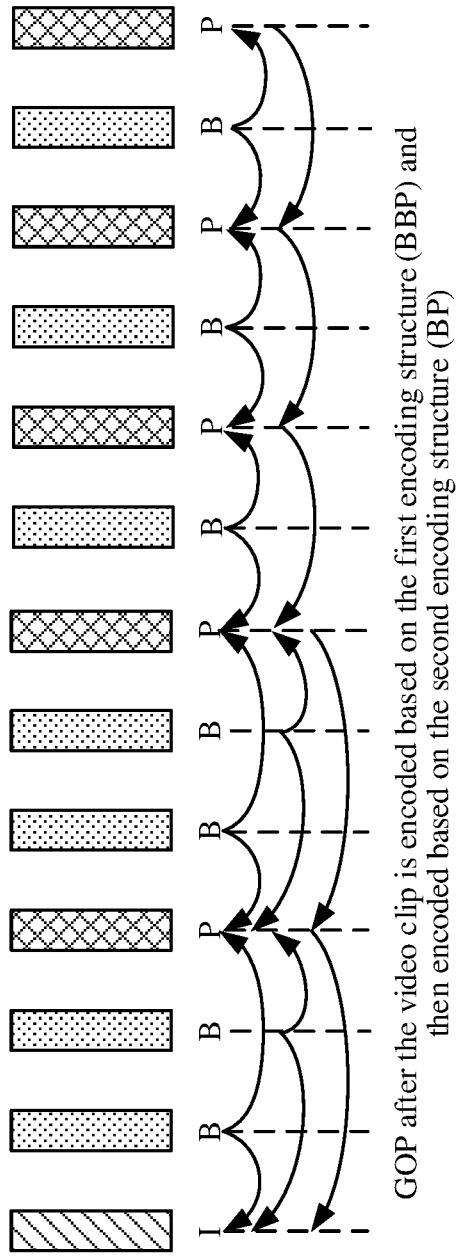
FIG. 10 is another schematic diagram of a GOP after a video clip is encoded according to an embodiment of this application.

For example, the first encoding structure is BBP, and the second encoding structure is BP. After the first picture frame of the video clip is decoded as an I frame, when the $2^{nd}$ to $11^{th}$ picture frames in the video clip are encoded, if the network status satisfies the transmitting and receiving conditions at the beginning of encoding, BBPBXP is obtained by encoding based on the first encoding structure, where the $6^{th}$ picture frame is a picture frame to be encoded, represented by X. When the $6^{th}$ picture frame is encoded, the network status does not satisfy the transmitting and receiving conditions. However, because the encoding of the current minigop is not completed, the $6^{th}$ picture frame is still encoded as a B frame based on the first encoding structure. Then, the $8^{th}$ to $11^{th}$ picture frames are encoded based on the second encoding structure to obtain BPBP. Finally, IBBPBBPBPBP is obtained by encoding the $1^{st}$ to $11^{th}$ picture frames, as shown in FIG. 10.

Generally, in the process of encoding a video clip, a sequence parameter set (SPS) and a picture parameter set (PPS) may be generated. The SPS stores a set of global parameters of a coded video sequence, where the coded video sequence refers to a structure after a plurality of picture frames in the video clip are encoded, such as the GOP in the foregoing embodiment of this application. The PPS stores parameters that each encoded frame in the GOP depends on.

It may be understood that SPS information and PPS information include information parameters required by a video decoder, namely, decoding of the encoded video needs to rely on SPS information and PPS information.

In some embodiments, if the previous encoded picture frame of the current picture frame to be encoded is encoded according to the corresponding frame type in the second encoding structure, after the current picture frame to be encoded is encoded based on the corresponding frame type of the current picture frame to be encoded in the first encoding structure, the following steps may further be performed:

> a1: Update sequence parameter set SPS information and picture parameter set PPS information generated by encoding; and
>
> a2: Send the updated SPS information and PPS information to the receiving end.

In the process of encoding the video clip, when the second encoding structure is adjusted to the first encoding structure, the quantity of B frames is increased, the SPS information and PPS information generated by the previous encoding may be updated, and the updated SPS information and PPS information may be sent to the receiving end, so that the receiving end decodes encoded video data based on the updated SPS information and PPS information after receiving the encoded video data.

In other embodiments, if the previous encoded picture frame of the current picture frame to be encoded is encoded according to the corresponding frame type in the first encoding structure, after the current picture frame to be encoded is encoded based on the corresponding frame type of the current picture frame to be encoded in the second encoding structure, the following steps may further be performed:

b1: Update picture parameter set PPS information generated by encoding; and b2: Send the updated PPS information to the receiving end.

In the process of encoding the video clip, when the first encoding structure is adjusted to the second encoding structure, if the B frames are closed or the quantity of B frames is reduced, the SPS information generated by the previous encoding may not be updated, only the PPS information may be updated, and the updated PPS information may be sent to the receiving end, so that the receiving end decodes encoded video data based on the SPS information generated by the previous encoding and the updated PPS information after receiving the encoded video data.

The video encoding method in the embodiments of this application will be illustratively introduced below with reference to FIG. 11.

Figure 11:
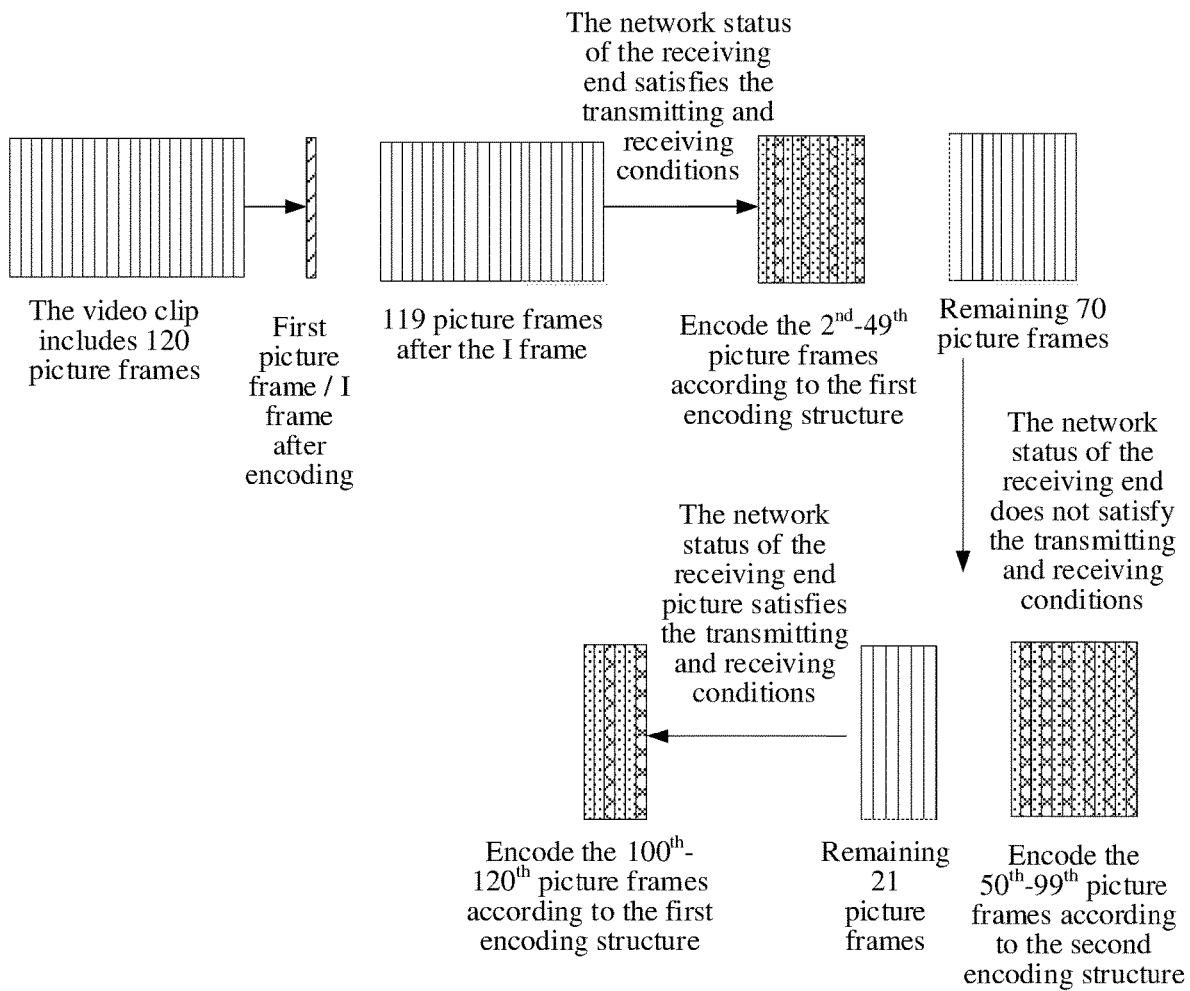
FIG. 11 is a schematic logic diagram of a video encoding method according to an embodiment of this application.

As shown in FIG. 11, assuming that a video clip to be encoded includes 120 picture frames, when the video clip is encoded, the first picture frame is encoded as an I frame; afterwards, when the 119 picture frames after the first picture frame are encoded, if the network status of the receiving end satisfies the transmitting and receiving conditions, the 119 picture frames are encoded according to the first encoding structure; if the network status of the receiving end changes from satisfying the transmitting and receiving conditions to not satisfying the transmitting and receiving conditions when the $50^{th}$ picture frame is encoded, the remaining picture frames are encoded according to the second encoding structure from the $50^{th}$ picture frame; and if the network status of the receiving end changes from not satisfying the transmitting and receiving conditions to satisfying the transmitting and receiving conditions when the $100^{th}$ picture frame is encoded, the remaining picture frames are encoded according to the first encoding structure again from the $100^{th}$ picture frame.

In this way, when the video clip is encoded, the encoding structure may be adjusted in real time according to the network status of the receiving end. When the network status of the receiving end is good, the quantity of bidirectional predicted frames is increased, which is beneficial to compressing the video clip and reducing video transmission bandwidth. When the network status of the receiving end is poor, the bidirectional predicted frames are closed or the quantity of bidirectional predicted frames is reduced, which may reduce delay during video decoding and relieve video rendering pause, thereby improving video playback quality.

Based on the same concept as the foregoing method embodiment of this application, an embodiment of this application further provides a video encoding apparatus. The principle of solving problems by the apparatus is similar to that by the method in the foregoing embodiment. Therefore, the implementation of the apparatus may refer to the implementation of the foregoing method, and repeated descriptions are omitted.

Figure 12:
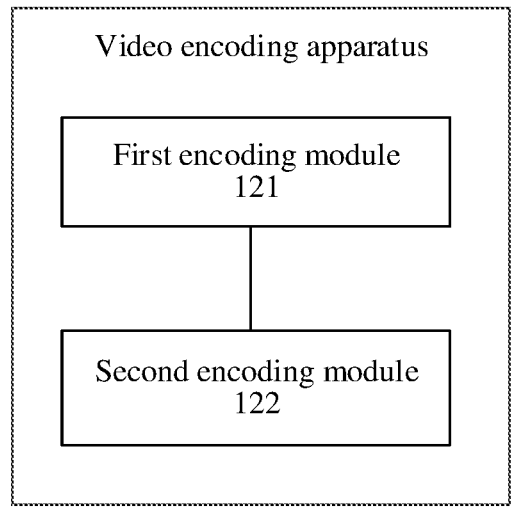
FIG. 12 is a structural block diagram of a video encoding apparatus according to an embodiment of this application.

As shown in FIG. 12, a video encoding apparatus provided in an embodiment of this application includes a first encoding module 121 and a second encoding module 122.

The first encoding module 121 is configured to encode a first picture frame in a video clip to be encoded as a video key frame.

The second encoding module 122 is configured to perform the following operation in order for a plurality of picture frames to be encoded after the first picture frame:

if it is determined that a network status of a receiving end satisfies transmitting and receiving conditions, encoding the current picture frame to be encoded based on a corresponding frame type of the current picture frame to be encoded in a first encoding structure, the first encoding structure at least including: M1 bidirectional predicted frames and one forward predicted frame in accordance with a first set order, where M1>0; or if it is determined that the network status does not satisfy the transmitting and receiving conditions, encoding the current picture frame to be encoded based on a corresponding frame type of the current picture frame to be encoded in a second encoding structure, the second encoding structure at least including: M2 bidirectional predicted frames and one forward predicted frame in accordance with a second set order, where M2≥0, and M2<M1.

In the embodiments of this application, when the video clip is encoded, the encoding structure may be adjusted in real time according to the network status of the receiving end. When the network status of the receiving end is poor, bidirectional predicted frames are closed or a quantity of bidirectional predicted frames is reduced, which may reduce delay during video decoding and relieve video rendering pause, thereby improving video playback quality.

In one embodiment, before encoding the current picture frame to be encoded based on a corresponding frame type of the current picture frame to be encoded in a first encoding structure, the second encoding module 122 is further configured to:

determine the corresponding frame type of the current picture frame to be encoded in the first encoding structure according to an interval between the current picture frame to be encoded and the previous forward predicted frame of the current picture frame to be encoded, and the first encoding structure; and before encoding the current picture frame to be encoded based on a corresponding frame type of the current picture frame to be encoded in a second encoding structure, the second encoding module 122 is further configured to:

determine the corresponding frame type of the current picture frame to be encoded in the second encoding structure according to an interval between the current picture frame to be encoded and the previous forward predicted frame of the current picture frame to be encoded, and the second encoding structure.

In one embodiment, when encoding the current picture frame to be encoded based on a corresponding frame type of the current picture frame to be encoded in a first encoding structure, the second encoding module 122 is further configured to:

if it is determined that the frame type is a bidirectional predicted frame, encode the current picture frame to be encoded based on a previous reference picture frame determined from the encoded picture frames presented before the current picture frame to be encoded, combined with a subsequent reference picture frame determined from the encoded picture frames presented after the current picture frame to be encoded; or if it is determined that the frame type is a forward predicted frame, encode the current picture frame to be encoded based on a previous reference picture frame determined from the picture frames before the current picture frame to be encoded.

In one embodiment, at M2=0, when encoding the current picture frame to be encoded based on a corresponding frame type of the current picture frame to be encoded in a second encoding structure, the second encoding module 122 is further configured to:

determine that the frame type is a forward predicted frame, and encode the current picture frame to be encoded based on a previous reference picture frame determined from the picture frames before the current picture frame to be encoded;

at M2>0, when encoding the current picture frame to be encoded based on a corresponding frame type of the current picture frame to be encoded in a second encoding structure, the second encoding module 122 is further configured to:

if it is determined that the frame type is a bidirectional predicted frame, encode the current picture frame to be encoded based on a previous reference picture frame determined from the encoded picture frames presented before the current picture frame to be encoded, combined with a subsequent reference picture frame determined from the encoded picture frames presented after the current picture frame to be encoded; or if it is determined that the frame type is a forward predicted frame, encode the current picture frame to be encoded based on a previous reference picture frame determined from the picture frames before the current picture frame to be encoded.

In some embodiments, the second encoding module 122 is further configured to:

if the network status satisfies the transmitting and receiving conditions, and the previous encoded picture frame of the current picture frame to be encoded is encoded based on the first encoding structure, encode the current picture frame to be encoded based on the first encoding structure; or if the network status satisfies the transmitting and receiving conditions, and the previous encoded picture frame of the current picture frame to be encoded is encoded based on the second encoding structure, in response to complete encoding of a minigop of the previous picture frame, switch the second encoding structure to the first encoding structure, and encode the current picture frame to be encoded based on the first encoding structure.

In some embodiments, the second encoding module 122 is further configured to:

if the network status does not satisfy the transmitting and receiving conditions, and the previous encoded picture frame of the current picture frame to be encoded is encoded based on the second encoding structure, encode the current picture frame to be encoded based on the second encoding structure; or if the network status does not satisfy the transmitting and receiving conditions, and the previous encoded picture frame of the current picture frame to be encoded is encoded based on the first encoding structure, in response to complete encoding of a minigop of the previous picture frame, switch the first encoding structure to the second encoding structure, and encode the current picture frame to be encoded based on the second encoding structure.

In some embodiments, the second encoding module 122 is further configured to:

if the network status does not satisfy the transmitting and receiving conditions, and the previous encoded picture frame of the current picture frame to be encoded is encoded based on the first encoding structure, in response to incomplete encoding of a minigop of the previous encoded picture frame, continue to encode the current picture frame to be encoded and subsequent picture frames to be encoded based on the first encoding structure until the encoding of the minigop based on the first encoding structure is completed, switch the first encoding structure to the second encoding structure, and start encoding based on the second encoding structure.

In one embodiment, if the previous encoded picture frame of the current picture frame to be encoded is encoded according to the corresponding frame type in the second encoding structure, after encoding the current picture frame to be encoded based on the corresponding frame type of the current picture frame to be encoded in the first encoding structure, the second encoding module 122 is further configured to:

update sequence parameter set SPS information and picture parameter set PPS information generated by encoding; and send the updated SPS information and PPS information to the receiving end.

In one embodiment, if the previous encoded picture frame of the current picture frame to be encoded is encoded according to the corresponding frame type in the first encoding structure, after encoding the current picture frame to be encoded based on the corresponding frame type of the current picture frame to be encoded in the second encoding structure, the second encoding module 122 is further configured to:

update picture parameter set PPS information generated by encoding; and send the updated PPS information to the receiving end.

Figure 13:
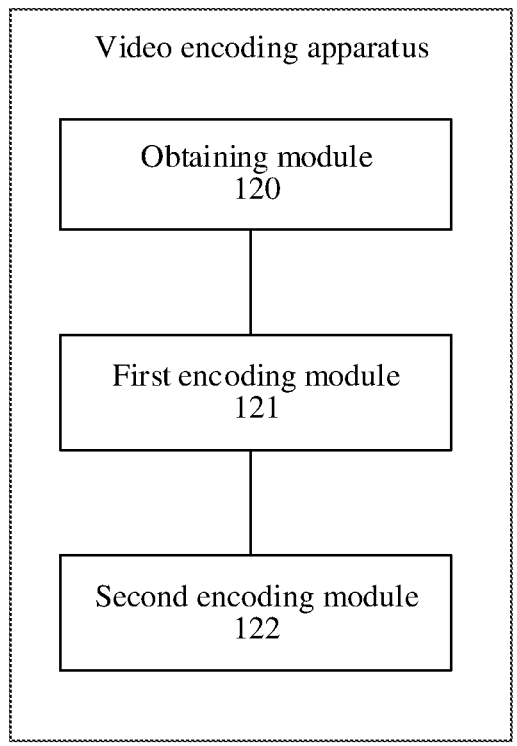
FIG. 13 is another structural block diagram of a video encoding apparatus according to an embodiment of this application.

In one embodiment, as shown in FIG. 13, the apparatus further includes an obtaining module 120, configured to:

divide obtained video data into a plurality of video clips, and sequentially select video clips to be encoded from the plurality of video clips; or sequentially select video clips to be encoded in a fixed step size from the obtained video data, where the fixed step size includes a set quantity of picture frames; or sequentially select video clips to be encoded in a non-fixed step size from the obtained video data.

In one embodiment, the transmitting and receiving conditions include at least one of the following:

a number of video pauses within first unit duration is not greater than a number threshold;

duration of video pauses within second unit duration is not greater than a first duration threshold;

duration of a rendering pause is not greater than a second duration threshold; and a packet loss rate of video data packets is not greater than a set threshold.

In the foregoing embodiment of this application, when the video clip is encoded, the encoding structure may be adjusted in real time according to the network status of the receiving end. When the network status of the receiving end is good, the quantity of bidirectional predicted frames is increased, which is beneficial to compressing the video clip and reducing video transmission bandwidth. When the network status of the receiving end is poor, the bidirectional predicted frames are closed or the quantity of bidirectional predicted frames is reduced, which may reduce delay during video decoding and relieve video rendering pause, thereby improving video playback quality.

For ease of description, the foregoing portions are respectively described as various modules (units) divided according to functions. Certainly, when this application is implemented, the functions of the modules (units) may be implemented in the same piece of or a plurality of pieces of software or hardware.

After the video encoding method and apparatus according to the exemplary embodiments of this application are introduced, a video encoding apparatus according to another exemplary embodiment of this application will be introduced below.

A person skilled in the art may understand that the aspects of this application may be implemented as systems, methods, or program products. Therefore, the aspects of this application may be specifically embodied in the following forms: hardware only implementations, software only implementations (including firmware, micro code, etc.), or implementations with a combination of software and hardware, which are collectively referred to as "circuit," "module," or "system" herein.

In some implementations, a video encoding apparatus according to this application may at least include a processor and a memory. The memory stores program code, and when the program code is performed by the processor, the processor is enabled to perform the steps of the video encoding method according to various exemplary implementations of this application described in this specification. For example, the processor may perform the steps shown in FIG. 3.

After the video encoding method and apparatus according to the exemplary embodiments of this application are introduced, an electronic device according to another exemplary embodiment of this application will be introduced below.

Based on the same inventive concept as the foregoing method embodiment of this application, an embodiment of this application further provides an electronic device. The principle of solving problems by the electronic device is similar to that by the method in the foregoing embodiment. Therefore, the implementation of the electronic device may refer to the implementation of the foregoing method, and repeated descriptions are omitted.

Figure 14:
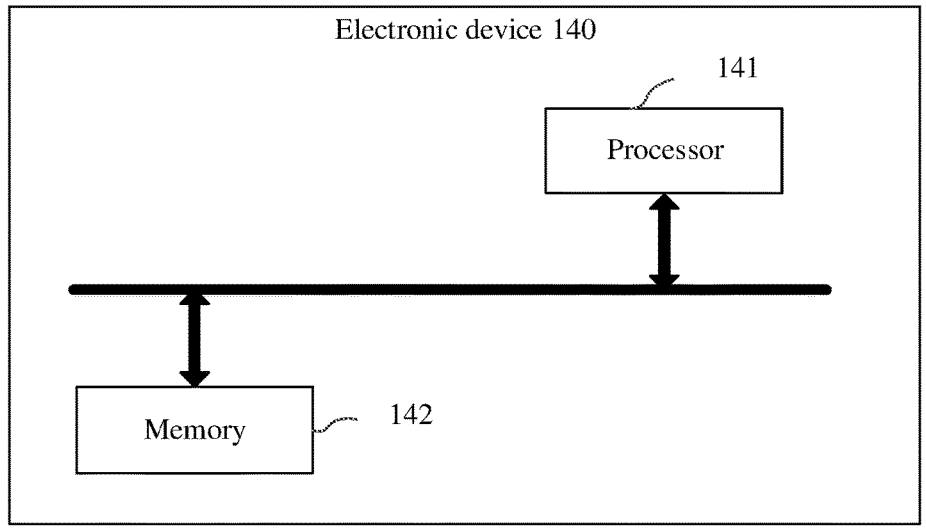
FIG. 14 is a schematic structural diagram of an electronic device according to an embodiment of this application.

As shown in FIG. 14, the electronic device 140 at least may include a processor 141 and a memory 142. The memory 142 stores program code, and the processor 141 is enabled to perform the steps of any of the foregoing video encoding methods when the program code is performed by the processor 141.

In some implementations, the electronic device according to this application may include at least one processor and at least one memory. The memory stores program code, and when the program code is performed by a processor, the processor is enabled to perform the steps of the video encoding method according to various exemplary implementations of this application described in this specification. For example, the processor may perform the steps shown in FIG. 3.

In an exemplary embodiment, this application further provides a storage medium including program code, for example, the memory 142 including program code, where the program code may be performed by the processor 141 of the electronic device 140 to complete the foregoing video encoding method. In some embodiments, the storage medium may be a non-transitory computer-readable storage medium. For example, the non-transitory computer-readable storage medium may be an ROM, a random access memory (RAM), a CD-ROM, a tape, a floppy disk, or an optical data storage device.

An electronic device 150 according to an implementation of this application will be described below with reference to FIG. 15. The electronic device 150 in FIG. 15 is merely an example, and does not constitute any limitation on functions and use scopes of the embodiments of this application.

Figure 15:
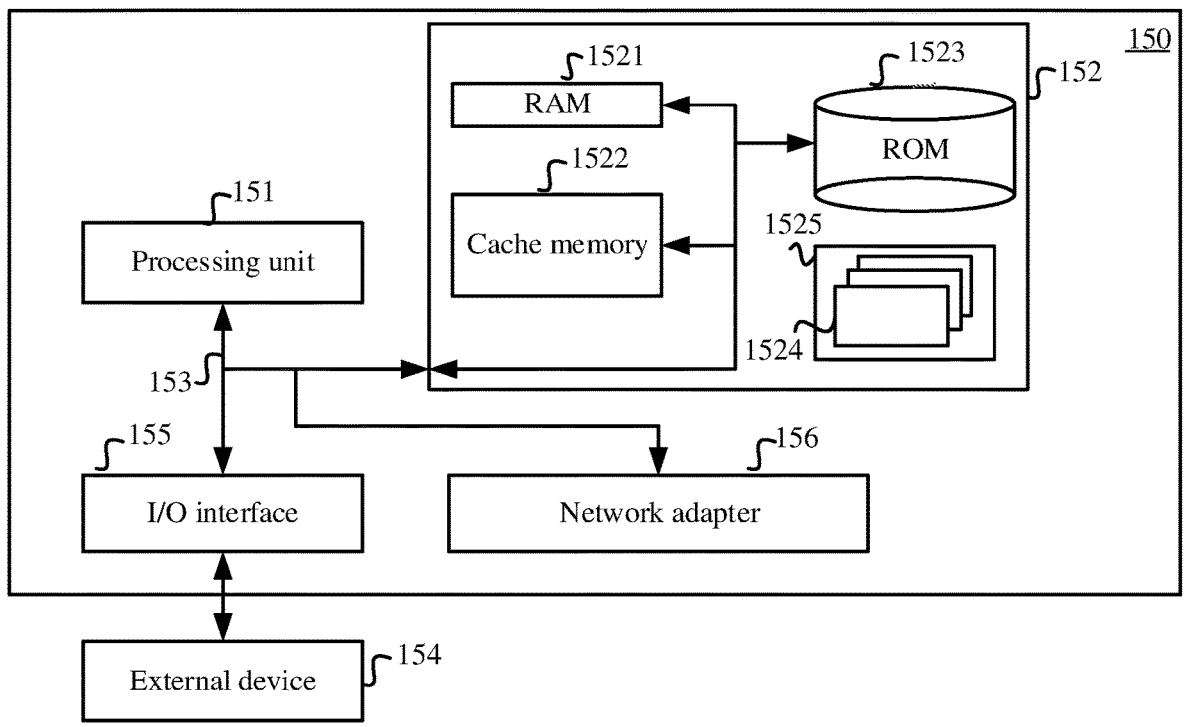
FIG. 15 is a schematic structural diagram of another electronic device according to an embodiment of this application.

As shown in FIG. 15, the electronic device 150 is represented in a form of a general-purpose electronic device. Components of the electronic device 150 may include, but are not limited to: at least one processing unit 151, at least one memory cell 152, and a bus 153 connecting different system components (including the memory cell 152 and the processing unit 151).

The bus 153 represents one or more of several types of bus structures, including a memory bus, a memory controller, a peripheral bus, a processor, or a local area bus using any of a variety of bus structures.

The memory cell 152 may include a readable medium in a form of a volatile memory, such as a random access memory (RAM) 1521 and/or a cache memory cell 1522, and may further include a read-only memory (ROM) 1523.

The memory cell 152 may further include a program/utility 1525 having a set of (at least one) program modules 1524. Such program modules 1524 include, but are not limited to: an operating system, one or more application programs, other program modules, and program data, and each or a combination of these examples may include implementation of a network environment.

The electronic device 150 may also communicate with one or more external devices 154 (such as a keyboard, and a pointing device), and may also communicate with one or more devices that enable a user to interact with the electronic device 150, and/or communicate with any device (such as a router, or a modem) that enables the electronic device 150 to communicate with one or more other electronic devices. The communication may be performed through an input/output (I/O) interface 155. In addition, the electronic device 150 may further communicate with one or more networks (such as a local area network (LAN), a wide area network (WAN), and/or a public network (such as the Internet)) through a network adapter 156. As shown in the figure, the network adapter 156 communicates with other modules of the electronic device 150 through the bus 153. It is to be understood that although not shown in the figure, other hardware and/or software modules may be used in combination with the electronic device 150, including, but not limited to: microcode, a device driver, a redundant processing unit, an external disk drive array, a RAID system, a tape driver, a data backup storage system, and the like.

In some implementations, each aspect of the video encoding method provided in this application may be further implemented in a form of a program product including program code. When the program product is run on the electronic device, the program code is used for enabling the electronic device to perform the steps of the video encoding method according to various exemplary implementations of this application described in this specification. For example, the electronic device may perform the steps shown in FIG. 3.

The program product may be a readable medium or any combination of more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a random access memory (RAM), a read-only memory (ROM), an erasable programmable read-only memory (EPROM or flash memory), a fiber, a portable compact disc read-only memory (CD-ROM), an optical memory, a magnetic memory, or any suitable combination of the above.

The program product according to the implementation of this application may be a compact disc read-only memory (CD-ROM), includes program code, and may be run on a computing apparatus. However, the program product in this application is not limited thereto. In this specification, the readable storage medium may be any tangible medium including or storing a program, and the program may be used by or used in combination with a command execution system, apparatus, or device.

The readable signal medium may include a data signal being in a baseband or transmitted as a part of a carrier, which carries readable program code. A data signal propagated in such a way may assume a plurality of forms, including, but not limited to, an electromagnetic signal, an optical signal, or any appropriate combination thereof. The readable signal medium may alternatively be any readable medium other than a readable storage medium, and the readable medium may send, propagate, or transmit a program used by or in combination with a command execution system, apparatus, or device.

The program code included in the readable storage medium may be transmitted by using any suitable medium, including but not limited to a wireless medium, a wired medium, an optical cable, RF, or any appropriate combination thereof.

Although several units or subunits of the apparatus are mentioned in the foregoing detailed descriptions, the division is merely exemplary but not mandatory. Actually, according to the implementations of this application, the features and functions of two or more units described above may be embodied in one unit. On the contrary, the features and functions of one unit described above may be further divided to be embodied by a plurality of units.

In addition, although the operations of the method in this application are described in a specific order in the accompanying drawings, this does not require or imply that the operations are bound to be performed in the specific order, or all the shown operations are bound to be performed to achieve expected results. Additionally, or alternatively, some steps may be omitted, a plurality of steps may be combined into one step for execution, and/or one step may be decomposed into a plurality of steps for execution.

A person skilled in the art may understand that the embodiments of this application may be provided as a method, a system, or a computer program product. Therefore, this application may be in a form of hardware-only embodiments, software-only embodiments, or embodiments combining software and hardware. Moreover, this application may be in a form of a computer program product implemented on one or more computer-usable storage media (including but not limited to a disk memory, a CD-ROM, an optical memory, and the like) that include computer-usable program code.

Although the embodiments of this application are described, once persons skilled in the art know a basic creative concept, they may make other changes and modifications to these embodiments. Therefore, the following claims are intended to cover the embodiments and all changes and modifications falling within the scope of this application.

Obviously, a person skilled in the art may make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A video encoding method, performed by an electronic device, comprising:
    encoding a first picture frame in a video clip as a video key frame; and
    encoding a plurality of picture frames after the first picture frame according to an encoding order, including, for a current picture frame of the plurality of picture frames, performing one of following operations:
        in response to determining that a network status of a receiving end of the video clip satisfies transmitting and receiving conditions, encoding the current picture frame based on a corresponding frame type of the current picture frame in a first encoding structure, the first encoding structure at least including M1 bidirectional predicted frames and one forward predicted frame in accordance with a first set order, and M1 being an integer and satisfying M1>0; or
        in response to determining that the network status does not satisfy the transmitting and receiving conditions, encoding the current picture frame based on a corresponding frame type of the current picture frame in a second encoding structure, the second encoding structure at least including M2 bidirectional predicted frames and one forward predicted frame in accordance with a second set order, and M2 being an integer and satisfying M2≥0 and M2<M1,
    wherein:
        in response to M2 equaling 0, encoding the current picture frame based on the corresponding frame type of the current picture frame in the second encoding structure includes:
            determining that the frame type is a forward predicted frame, and encoding the current picture frame based on a previous reference picture frame determined from picture frames before the current picture frame; and
        in response to M2 being larger than 0, encoding the current picture frame based on the corresponding frame type of the current picture frame in the second encoding structure includes:
            in response to determining that the frame type is a bidirectional predicted frame, encoding the current picture frame based on:
                the previous reference picture frame determined from the encoded picture frames presented before the current picture frame, and a subsequent reference picture frame determined from encoded picture frames presented after the current picture frame; or in response to determining that the frame type is a forward predicted frame, encoding the current picture frame based on the previous reference picture frame determined from the picture frames before the current picture frame.

2. The method according to claim 1, further comprising:
determining the corresponding frame type of the current picture frame in the first encoding structure according to the first encoding structure and an interval between the current picture frame and a previous forward predicted frame of the current picture frame; and
determining the corresponding frame type of the current picture frame in the second encoding structure according to the second encoding structure and the interval between the current picture frame and the previous forward predicted frame of the current picture frame.

3. The method according to claim 1, wherein encoding the current picture frame based on the corresponding frame type of the current picture frame in the first encoding structure includes:
in response to determining that the frame type is a bidirectional predicted frame, encoding the current picture frame based on:
a previous reference picture frame determined from encoded picture frames presented before the current picture frame, and
a subsequent reference picture frame determined from encoded picture frames presented after the current picture frame; or
in response to determining that the frame type is a forward predicted frame, encoding the current picture frame based on the previous reference picture frame determined from the picture frames before the current picture frame.

4. The method according to claim 1, wherein encoding the current picture frame based on the corresponding frame type of the current picture frame in the first encoding structure includes:
in response to a previous encoded picture frame of the current picture frame being encoded based on the first encoding structure, encoding the current picture frame based on the first encoding structure; or
in response to the previous encoded picture frame of the current picture frame being encoded based on the second encoding structure, switching from the second encoding structure to the first encoding structure in response to completion of encoding a minigop to which the previous picture frame belong, and encoding the current picture frame based on the first encoding structure.

5. The method according to claim 1, wherein encoding the current picture frame based on the corresponding frame type of the current picture frame in the second encoding structure includes:
in response to a previous encoded picture frame of the current picture frame being encoded based on the second encoding structure, encoding the current picture frame based on the second encoding structure; or
in response to the previous encoded picture frame of the current picture frame being encoded based on the first encoding structure, switching from the first encoding structure to the second encoding structure in response to completion of encoding a minigop to which the previous picture frame belongs, and encoding the current picture frame based on the second encoding structure.

6. The method according to claim 1, wherein encoding the current picture frame based on the corresponding frame type of the current picture frame in the second encoding structure includes:
in response to a previous encoded picture frame of the current picture frame being encoded based on the first encoding structure, and in response to encoding of a minigop to which the previous encoded picture frame belongs having not completed, continuing to encode the current picture frame and subsequent picture frames based on the first encoding structure until the encoding of the minigop based on the first encoding structure is completed, then switching from the first encoding structure to the second encoding structure, and starting encoding based on the second encoding structure.

7. The method according to claim 1, further comprising:
in response to a previous encoded picture frame of the current picture frame being encoded according to the corresponding frame type in the second encoding structure:
updating sequence parameter set (SPS) information and picture parameter set (PPS) information generated by encoding; and
transmitting the updated SPS information and PPS information to the receiving end.

8. The method according to claim 1, further comprising:
in response to a previous encoded picture frame of the current picture frame being encoded according to the corresponding frame type in the first encoding structure:
updating picture parameter set (PPS) information generated by encoding; and
transmitting the updated PPS information to the receiving end.

9. The method according to claim 1, further comprising:
dividing obtained video data into a plurality of video clips, and sequentially selecting video clips from the plurality of video clips;
sequentially selecting video clips in a fixed step size from the obtained video data, the fixed step size including a set quantity of picture frames; or
sequentially selecting video clips in a non-fixed step size from the obtained video data.

10. The method according to claim 1, wherein the transmitting and receiving conditions includes at least one of following:
a number of video pauses within first unit duration is not greater than a number threshold;
duration of video pauses within second unit duration is not greater than a first duration threshold;
duration of a rendering pause is not greater than a second duration threshold; and
a packet loss rate of video data packets is not greater than a set threshold.

11. An electronic device comprising:
a memory storing program codes; and
a processor configured to execute the program codes to:
encode a first picture frame in a video clip as a video key frame; and
encode a plurality of picture frames after the first picture frame according to an encoding order, including, for a current picture frame of the plurality of picture frames, performing one of following operations:

in response to determining that a network status of a receiving end of the video clip satisfies transmitting and receiving conditions, encoding the current picture frame based on a corresponding frame type of the current picture frame in a first encoding structure, the first encoding structure at least including M1 bidirectional predicted frames and one forward predicted frame in accordance with a first set order, and M1 being an integer and satisfying M1>0; or in response to determining that the network status does not satisfy the transmitting and receiving conditions, encoding the current picture frame based on a corresponding frame type of the current picture frame in a second encoding structure, the second encoding structure at least including M2 bidirectional predicted frames and one forward predicted frame in accordance with a second set order, and M2 being an integer and satisfying M2≥0 and M2<M1, in response to M2 equaling 0:
determine that the frame type is a forward predicted frame, and encoding the current picture frame based on a previous reference picture frame determined from picture frames before the current picture frame; and in response to M2 being larger than 0:
in response to determining that the frame type is a bidirectional predicted frame, encode the current picture frame based on:
the previous reference picture frame determined from the encoded picture frames presented before the current picture frame, and
a subsequent reference picture frame determined from encoded picture frames presented after the current picture frame; or
in response to determining that the frame type is a forward predicted frame, encode the current picture frame based on the previous reference picture frame determined from the picture frames before the current picture frame.

12. The device according to claim 11, wherein the processor is further configured to execute the program codes to:
determine the corresponding frame type of the current picture frame in the first encoding structure according to the first encoding structure and an interval between the current picture frame and a previous forward predicted frame of the current picture frame; and
determine the corresponding frame type of the current picture frame in the second encoding structure according to the second encoding structure and the interval between the current picture frame and the previous forward predicted frame of the current picture frame.

13. The device according to claim 11, wherein the processor is further configured to execute the program codes to:
in response to determining that the frame type is a bidirectional predicted frame, encode the current picture frame based on:
a previous reference picture frame determined from encoded picture frames presented before the current picture frame, and
a subsequent reference picture frame determined from encoded picture frames presented after the current picture frame; or
in response to determining that the frame type is a forward predicted frame, encoding the current picture frame based on the previous reference picture frame determined from the picture frames before the current picture frame.

14. The device according to claim 11, wherein the processor is further configured to execute the program codes to:
in response to a previous encoded picture frame of the current picture frame being encoded based on the first encoding structure, encode the current picture frame based on the first encoding structure; or
in response to the previous encoded picture frame of the current picture frame being encoded based on the second encoding structure, switch from the second encoding structure to the first encoding structure in response to completion of encoding a minigop to which the previous picture frame belong, and encode the current picture frame based on the first encoding structure.

15. The device according to claim 11, wherein the processor is further configured to execute the program codes to:
in response to a previous encoded picture frame of the current picture frame being encoded based on the second encoding structure, encode the current picture frame based on the second encoding structure; or
in response to the previous encoded picture frame of the current picture frame being encoded based on the first encoding structure, switch from the first encoding structure to the second encoding structure in response to completion of encoding a minigop to which the previous picture frame belongs, and encode the current picture frame based on the second encoding structure.

16. The device according to claim 11, wherein the processor is further configured to execute the program codes to:
in response to a previous encoded picture frame of the current picture frame being encoded based on the first encoding structure, and in response to encoding of a minigop to which the previous encoded picture frame belongs having not completed, continue to encode the current picture frame and subsequent picture frames based on the first encoding structure until the encoding of the minigop based on the first encoding structure is completed, then switch from the first encoding structure to the second encoding structure, and start encoding based on the second encoding structure.

17. The device according to claim 11, wherein the processor is further configured to execute the program codes to, in response to a previous encoded picture frame of the current picture frame being encoded according to the corresponding frame type in the second encoding structure:
update sequence parameter set (SPS) information and picture parameter set (PPS) information generated by encoding; and
transmit the updated SPS information and PPS information to the receiving end.

18. A non-transitory computer-readable storage medium storing program codes that, when executed by a processor, cause the processor to:
encode a first picture frame in a video clip as a video key frame; and
encode a plurality of picture frames after the first picture frame according to an encoding order, including, for a current picture frame of the plurality of picture frames, performing one of following operations:
in response to determining that a network status of a receiving end of the video clip satisfies transmitting and receiving conditions, encoding the current picture frame based on a corresponding frame type of the current picture frame in a first encoding structure, the first encoding structure at least including M1 bidirectional predicted frames and one forward predicted frame in accordance with a first set order, and M1 being an integer and satisfying M1>0; or in response to determining that the network status does not satisfy the transmitting and receiving conditions, encoding the current picture frame based on a corresponding frame type of the current picture frame in a second encoding structure, the second encoding structure at least including M2 bidirectional predicted frames and one forward predicted frame in accordance with a second set order, and M2 being an integer and satisfying M2≥0 and M2<M1, wherein:

in response to M2 equaling 0, encoding the current picture frame based on the corresponding frame type of the current picture frame in the second encoding structure includes:

determining that the frame type is a forward predicted frame, and encoding the current picture frame based on a previous reference picture frame determined from picture frames before the current picture frame; and in response to M2 being larger than 0, encoding the current picture frame based on the corresponding frame type of the current picture frame in the second encoding structure includes:

in response to determining that the frame type is a bidirectional predicted frame, encoding the current picture frame based on:

the previous reference picture frame determined from the encoded picture frames presented before the current picture frame, and a subsequent reference picture frame determined from encoded picture frames presented after the current picture frame; or in response to determining that the frame type is a forward predicted frame, encoding the current picture frame based on the previous reference picture frame determined from the picture frames before the current picture frame.

* * * * *